Aug. 10, 1954 S. K. STEVENS 2,686,231

EARPHONE SET PAD

Filed Jan. 17, 1952

Sallie K. Stevens
INVENTOR.

BY Clarence A. O'Brien
and Harvey B. Jacobson
Attorneys

Patented Aug. 10, 1954 2,686,231

UNITED STATES PATENT OFFICE 2,686,231

EARPHONE SET PAD

Sallie K. Stevens, Los Angeles, Calif.

Application January 17, 1952, Serial No. 266,803

2 Claims. (Cl. 179—156)

This invention relates generally to a resilient pad, and more specifically to a resilient pad mounted on the head band of a conventional earphone set in common usage by telephone operators.

The telephone operators' head set now in use universally throughout the country is attached to the head of the operator by a narrow spring steel band which tightly engages the head. Since the telephone operator is required to wear the head set for a long period of time without removing same, oftentimes the operator develops a headache due to the pressure on her head. Since the head band is of spring steel and therefore smooth, the band cannot be loosened with respect to the head of the operator as it would then allow the head set to slip off the side of the head of the operator to a position whereby she could not hear properly.

The primary object of this invention is to provide an improved pad which is intended to be mounted on the head band of an operator's head set adjacent the free end thereof for engaging the telephone operator's head over a large area and thereby relieve the concentrated pressure on her head.

Another object of this invention is to provide a resilient pad for use in combination with the head band of an operator's head set, said pad being formed of foam rubber whereby it forms a cushion.

Another object of this invention is to provide an improved pad for use with the head band of the telephone operator's head set, said pad being formed of a common rubber product and is of a simple design whereby it may be economically manufactured.

A further object of this invention is to provide an improved pad for use with the head band of a telephone operator's head set, said pad having slits therethrough for receiving the head band in sliding relation thereto.

A still further object of the present invention is to provide an improved pad formed of resilient material and having parallel slits therein for receiving the head band of a telephone operator's head set, said pad having a smooth upper surface for engaging the under side of the band in sliding relation thereto, and a roughened under surface for engaging the head of the telephone operator so as to resist sliding movement between the head and the head band of the telephone operator.

With these objects definitely in view, together with various and ancillary features and objects of the invention, which will later become apparent as the following description proceeds, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 3:
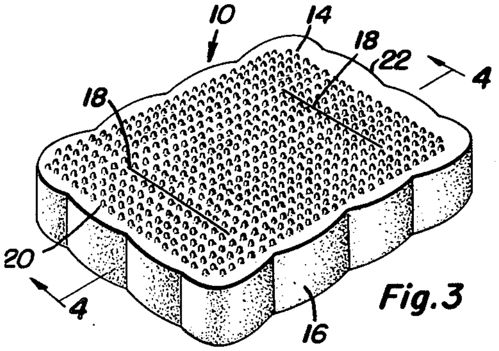
Figure 3 is an enlarged perspective view of the resilient pad, which is the subject of this invention, and showing the construction of the underside of the pad and the arrangement of the slits therein; and, Figure 4 is an enlarged transverse vertical sectional view taken substantially upon the plane indicated by the section line 4—4 of Figure 3 and showing the arrangement of the slits in said pad.
Figure 4:
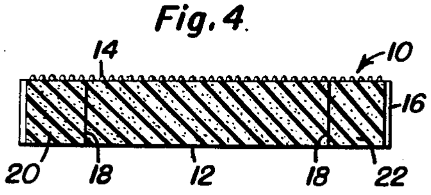

Similar characters of reference designate similar or identical elements and portions throughout the specification and throughout the different views in the drawings. Referring now to the drawings in detail, it will be seen that the resilient pad, which is the subject of this invention, is clearly illustrated in Figure 3 and referred to in general by the reference numeral 10. The resilient pad 10 is flat and substantially rectangular in plan view. The pad 10 has a smooth upper surface of face 12 and a lower face 14 provided with a plurality of equally spaced pin point projections. While the resilient pad 10 is generally rectangular in plan view, its peripheral edge 16 is scalloped in order to give the pad a fanciful configuration.

In order that the resilient pad 10 may be secured on the head band of a telephone operator's head set, the pad is provided with a pair of spaced parallel slits 18 which extend transversely of the length of the pad and are adjacent the ends thereof. The slits 18 extend through the pad 10 and open outwardly through the faces 12 and 14 thereof. The slitting of the pad 10 forms end portions 20 and 22 which may be moved vertically with respect to the main portion of the pad.

Figure 1:
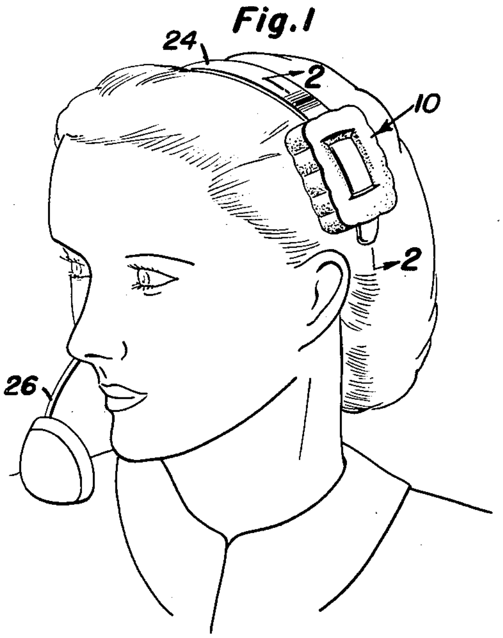
Figure 1 is a perspective view of the head of a telephone operator who has mounted on her head a head set secured thereon by a head band, said head band being provided with a resilient pad, said pad being the subject of this invention.
Figure 2:
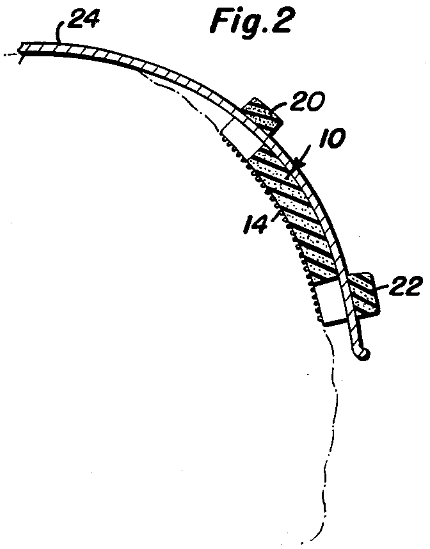
Figure 2 is an enlarged partial transverse vertical sectional view taken substantially upon the plane indicated by the section line 2—2 of Figure 1 and showing the manner in which the resilient pad is secured to the head band.

Referring now to Figures 1 and 2 in particular, it will be seen that the resilient pad 10 is mounted on the head band 24 of a telephone operator's head set 26 by passing the head band 24 through the slits 18. The insertion of the head band 24 through the slits 18 of the pad results in the end portions 20 and 22 being offset from the main portion of the pad with the end portions overlying the head band 24 and the head band 24 overlying the central portion of the pad 10.

Since the resilient pad 10 is formed of a rubber material, the pad resiliently grips the head band 24 and remains in its adjusted position thereon. As is best illustrated in Figure 1, when the resilient pad 10 is applied to the head band 24 of the telephone operator's head set, the bottom face of the pad engages the telephone operator's head with a cushioning effect and prevents the head band 24 from applying pressure over a localized area. Due to the provision of the bottom face 14 of the pad with a plurality of equally spaced pin point projections, the pad 10 effectively engages the hair and head of the telephone operator so that the operator's head set 26 does not slide with respect to the telephone operator's head.

A telephone operator's head set having its head band 24 provided with the resilient pad 10, which is the subject of this invention, not only relieves the concentrated pressure on the telephone operator's head to eliminate the cause of frequent headaches, but also provides greater stability for the head set 26. Furthermore, the design of the resilient pad 10 is such that the provision of same on the head band 24 enhances the appearance of the telephone operator due to its ornamental design.

The function of this pad will be understood from the foregoing description of the details thereof, taken in connection with the above recited objects and the attached drawings. Further description would appear unnecessary.

Minor modifications of the resilient pad, varying in minor details from the embodiment of the pad illustrated and described herein, may be resorted to without departure from the spirit and scope of the invention as defined in the appended claims.

Having described the invention, what is claimed as new is:

1. The combination of a head engageable strap and a resilient pad, said pad being generally rectangular in outline and being formed of sponge rubber, one face of said pad being smooth, the opposite face of said pad being provided with a plurality of integral pin point head engageable projections, a pair of spaced parallel slits in said pad intermediate ends of said pad, said slits extending through both of said faces and being transverse to the length of said pad, said strap being passed through said slits, said strap overlying a central portion of said pad, end portions of said pad adjacent said slits being deformed out of the general plane of said pad and overlying said straps.

2. The combination of a head engageable strap and a resilient pad, said pad being generally rectangular in outline and being formed of sponge rubber, one face of said pad being smooth, the opposite face of said pad being provided with a plurality of integral pin point head engageable projections, a pair of spaced parallel slits in said pad intermediate ends of said pad, said slits extending through both of said faces and being transverse to the length of said pad, said strap being passed through said slits, said strap overlying a central portion of said pad, end portions of said pad adjacent said slits being deformed out of the general plane of said pad and overlying said strap, said pad having a scalloped peripheral edge.

References Cited in the file of this patent

UNITED STATES PATENTS

| Number | Name | Date |
|---|---|---|
| 1,055,077 | Quirk | Mar. 4, 1913 |
| 1,578,642 | Clark | Mar. 30, 1926 |
| 1,596,171 | Francisco | Aug. 17, 1926 |
| 1,748,003 | Barnowitz | Feb. 18, 1930 |
| 1,987,390 | Davis | Jan. 8, 1935 |
| 2,071,647 | Miller | Feb. 23, 1937 |
| 2,535,269 | Coie | Dec. 26, 1950 |

FOREIGN PATENTS

| Number | Country | Date |
|---|---|---|
| 73,389 | Norway | Apr. 19, 1948 |